United States Patent
Suzuki et al.

(10) Patent No.: US 7,441,402 B2
(45) Date of Patent: Oct. 28, 2008

(54) EXHAUST GAS CONTROL APPARATUS AND EXHAUST GAS CONTROL METHOD FOR INTERNAL COMBUSTION ENGINE

(75) Inventors: Hisanobu Suzuki, Toyota (JP); Tadashi Toyota, Kariya (JP)

(73) Assignees: Toyota Jidosha Kabushiki Kaisha, Toyota-shi (JP); Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 11/146,103

(22) Filed: Jun. 7, 2005

(65) Prior Publication Data

US 2005/0274106 A1    Dec. 15, 2005

(30) Foreign Application Priority Data

Jun. 14, 2004    (JP)    ............................. 2004-175941

(51) Int. Cl.
*F01N 3/00*    (2006.01)
(52) U.S. Cl. .............................. 60/286; 60/287; 60/294; 60/295
(58) Field of Classification Search .................. 60/286, 60/287, 294, 295
See application file for complete search history.

(56) References Cited

U.S. PATENT DOCUMENTS

| | | | | | |
|---|---|---|---|---|---|
| 2,305,295 | A | * | 12/1942 | Lang et al. | 60/605.1 |
| 6,167,698 | B1 | * | 1/2001 | King et al. | 60/286 |
| 6,408,616 | B1 | * | 6/2002 | Mazur et al. | 60/277 |
| 6,477,834 | B1 | * | 11/2002 | Asanuma et al. | 60/295 |
| 6,698,190 | B2 | * | 3/2004 | Docter et al. | 60/285 |
| 6,735,941 | B2 | * | 5/2004 | Saito et al. | 60/295 |
| 6,813,882 | B2 | * | 11/2004 | Hepburn et al. | 60/286 |
| 6,910,329 | B2 | * | 6/2005 | Bunting et al. | 60/297 |
| 6,962,046 | B2 | * | 11/2005 | Kuboshima et al. | 60/295 |
| 6,981,370 | B2 | * | 1/2006 | Opris et al. | 60/311 |
| 7,055,309 | B2 | * | 6/2006 | Plote et al. | 60/277 |
| 7,104,049 | B2 | * | 9/2006 | Hiranuma et al. | 60/295 |
| 2002/0148219 | A1 | | 10/2002 | Matsuoka et al. | |
| 2003/0101713 | A1 | * | 6/2003 | Dalla Betta et al. | 60/284 |
| 2003/0230076 | A1 | * | 12/2003 | Kwon | 60/295 |
| 2006/0130461 | A1 | * | 6/2006 | Gabrielsson et al. | 60/286 |

FOREIGN PATENT DOCUMENTS

| | | |
|---|---|---|
| DE | 41 30 378 A1 | 3/1983 |
| DE | 199 41 439 A1 | 3/2000 |
| EP | 1 024 254 A2 | 10/1999 |
| EP | 1 176 289 A2 | 1/2002 |
| JP | A-11-117786 | 4/1999 |
| JP | 2000-314308 A | 11/2000 |
| JP | 2002038939 A | 2/2002 |
| JP | 2002106332 | 4/2002 |
| JP | 2003-120279 A | 4/2003 |

OTHER PUBLICATIONS

French Search Report, Appln. No. 0505970 issued Mar. 21, 2007.

* cited by examiner

*Primary Examiner*—Thomas Denion
*Assistant Examiner*—Loren Edwards
(74) *Attorney, Agent, or Firm*—Kenyon & Kenyon LLP

(57) ABSTRACT

In an exhaust gas control apparatus and exhaust gas control method for an internal combustion engine, in which fuel is supplied to a purification mechanism provided in an exhaust passage so that a function of the purification mechanism is recovered. A flow rate of exhaust gas flowing in the exhaust passage or a value correlated with the flow rate is detected, and fuel supply timing is controlled based on a result of the detection. Accordingly, even when the flow rate of the exhaust gas flowing in the exhaust passage is variously changed based on the engine operating state, the fuel supply timing can be set based on the flow rate that is appropriately detected. Thus, it is possible to appropriately convey the supplied fuel to the purification mechanism using force of the exhaust gas.

10 Claims, 3 Drawing Sheets

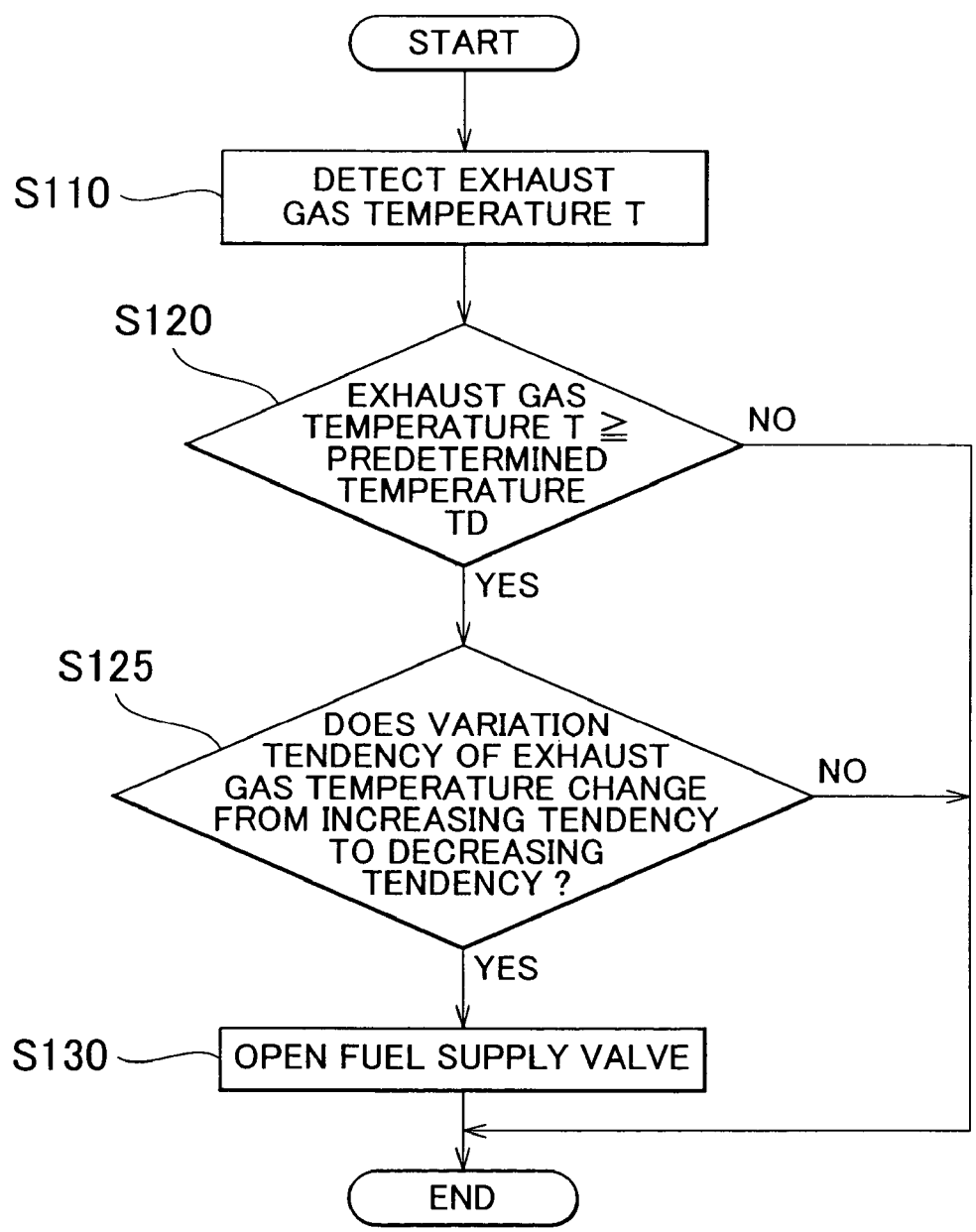

EXHAUST GAS CONTROL APPARATUS AND EXHAUST GAS CONTROL METHOD FOR INTERNAL COMBUSTION ENGINE

INCORPORATION BY REFERENCE

The disclosure of Japanese Patent Application No. 2004-175941 filed on Jun. 14, 2004, including the specification, drawings and abstract is incorporate herein by reference in its entirety.

BACKGROUND OF THE INVENTION

1. Field of the Invention

The invention relates to an exhaust gas control apparatus and exhaust gas control method for an internal combustion engine, which includes a purification mechanism that purifies exhaust gas discharged from an internal combustion engine.

2. Description of the Related Art

In general, an internal combustion engine is provided with an apparatus that purifies exhaust gas using a purification mechanism such as a catalyst. The purification mechanism is provided in an exhaust passage for the internal combustion engine. While the purification mechanism is used for a long time, particulate matter (PM) and sulfur components gradually adhere to the purification mechanism, and therefore a function of the purification mechanism tends to decrease. Accordingly, a recovery process is performed at given time intervals. In the recovery process, fuel is supplied to the purification mechanism, and PM and the sulfur components are burned and removed so that the function of the purification mechanism is recovered.

When the recovery process is performed, that is, when fuel is supplied to the purification mechanism, for example, the fuel is injected to the exhaust passage from a fuel supply valve provided in the exhaust passage at a predetermined pressure. In a case where the fuel is constantly injected from the fuel supply valve, the fuel may remain in the exhaust passage without being conveyed to the purification mechanism such as the catalyst, and the fuel may adhere to a wall surface of the exhaust passage during a period from an exhaust stroke of a cylinder until an exhaust stroke of another cylinder.

In order to solve such a problem, Japanese Patent Publication Application No. JP (A) 2002-106332 discloses an apparatus which supplies fuel during a period in which exhaust gas is discharged from a cylinder. In this apparatus, fuel is injected to an exhaust passage according to a crank angle phase of an internal combustion engine. In other words, the fuel is injected to the exhaust passage during a period in which an exhaust valve is opened, that is, during a period in which exhaust gas is discharged from the cylinder.

In order to efficiently recover the purification mechanism such as the catalyst, it is desirable that the fuel supplied to the exhaust passage should be appropriately conveyed to the purification mechanism by an exhaust gas flow. The exhaust gas flow in the exhaust passage is generally influenced by exhaust gas discharged from plural cylinders. Therefore, even when fuel injection timing is set such that the fuel is supplied during the period in which the exhaust valve in a specific cylinder is opened, the fuel supply timing does not necessarily become appropriate for a flowing condition of the exhaust gas in the exhaust gas passage. Particularly, this tendency becomes noticeable in a collecting exhaust passage into which exhaust gas discharged from each of plural cylinders flows.

In the aforementioned conventional apparatus, since the fuel supply timing is simply set such that the fuel is supplied during the period in which the exhaust valve is opened, the fuel can be injected intermittently. However, the apparatus needs to be improved, considering the fuel supply timing needs to be set such that the fuel is appropriately supplied to the purification mechanism while suppressing adhesion of the fuel to the exhaust passage.

SUMMARY OF THE INVENTION

In view of the above, it is an object of the invention to provide an exhaust gas control apparatus for an internal combustion engine, in which when fuel is supplied to a purification mechanism provided in an exhaust passage so that a function of the purification mechanism is recovered, the fuel can be appropriately supplied to the purification mechanism while suppressing adhesion of the supplied fuel to a wall surface of the exhaust passage.

An aspect of the invention relates to an exhaust gas control apparatus for an internal combustion engine, in which fuel is supplied to a purification mechanism provided in an exhaust passage so that a function of the purification mechanism is recovered. The exhaust gas control apparatus includes a sensor which is provided in the exhaust passage, and which performs detection of a flow rate of exhaust gas flowing in the exhaust passage or a value correlated with the flow rate; and a controller which controls fuel supply timing at which the fuel is supplied, based on a result of the detection performed by the sensor.

Another aspect of the invention relates to an exhaust gas control method for an internal combustion engine, in which fuel is supplied to a purification mechanism provided in an exhaust passage so that a function of the purification mechanism is recovered. The exhaust gas control method includes performing detection of a flow rate of exhaust gas flowing in the exhaust passage or a value correlated with the flow rate; and controlling fuel supply timing at which the fuel is supplied, based on a result of the detection.

In the aforementioned exhaust gas control apparatus and exhaust gas control method for an internal combustion engine, detection of the flow rate of the exhaust gas flowing in the exhaust passage or the value correlated with the flow rate is performed, and the fuel supply timing at which the fuel is supplied to the purification mechanism is controlled based on the result of the detection. Accordingly, even when the flow rate of the exhaust gas flowing in the exhaust passage is variously changed based on the engine operating state, the fuel supply timing at which the fuel is supplied can be set based on the flow rate that is appropriately detected. Thus, it is possible to appropriately convey the supplied fuel to the purification mechanism using force of the exhaust gas. As a result, it is possible to appropriately recover the function of the purification mechanism, while suppressing adhesion of the supplied fuel to a wall surface of the exhaust passage.

The fuel can be supplied to the purification mechanism, for example, by injecting the fuel from a fuel injection valve provided for each of cylinders of the internal combustion engine during an exhaust stroke. Also, the fuel can be supplied to the purification mechanism from a fuel supply valve provided upstream of the purification mechanism in the exhaust passage. By providing the fuel supply valve separately from the fuel injection valve provided in each of the cylinders, the fuel can be supplied to the purification mechanism separately from the fuel injection into each of the cylinders, with no restriction being imposed by the fuel injection into each of the cylinders.

A yet another aspect of the invention relates to an exhaust gas control apparatus for an internal combustion engine, in which fuel is supplied to a purification mechanism provided in an exhaust passage so that a function of the purification mechanism is recovered. The exhaust gas control apparatus includes a sensor which is provided in the exhaust passage, and which performs detection of a flow rate of exhaust gas flowing in the exhaust passage or a value correlated with the flow rate; and a controller which controls an amount of the fuel to be supplied, based on a result of the detection performed by the sensor.

A yet another aspect of the invention relates to an exhaust gas control method for an internal combustion engine, in which fuel is supplied to a purification mechanism provided in an exhaust passage so that a function of the purification mechanism is recovered. The exhaust gas control method includes performing detection of a flow rate of exhaust gas flowing in the exhaust passage or a value correlated with the flow rate; and controlling an amount of the fuel to be supplied, based on a result of the detection.

In the aforementioned exhaust gas control apparatus and exhaust gas control method for an internal combustion engine, detection of the flow rate of the exhaust gas flowing in the exhaust passage or the value correlated with the flow rate is performed, and the amount of the fuel to be supplied to the purification mechanism is controlled based on the result of the detection. Accordingly, even when the flow rate of the exhaust gas flowing in the exhaust passage is variously changed based on the engine operating state, the amount of the fuel to be supplied can be set based on the flow rate that is appropriately detected. As a result, it is possible to set the amount of the fuel to be supplied to a value appropriate for recovering the function of the purification mechanism while suppressing adhesion of the supplied fuel to a wall surface of the exhaust passage. Thus, it is possible to appropriately recover the function of the purification mechanism.

BRIEF DESCRIPTION OF THE DRAWINGS

The above-mentioned and other features, advantages, technical and industrial significance of this invention will be better understood by reading the following detailed description of the exemplary embodiments of the invention, when considered in connection with the accompanying drawings, in which:

FIG. 4 is a flowchart showing processes according to a second embodiment of the invention.

DETAILED DESCRIPTION OF THE EXEMPLARY EMBODIMENTS

Figure 1:
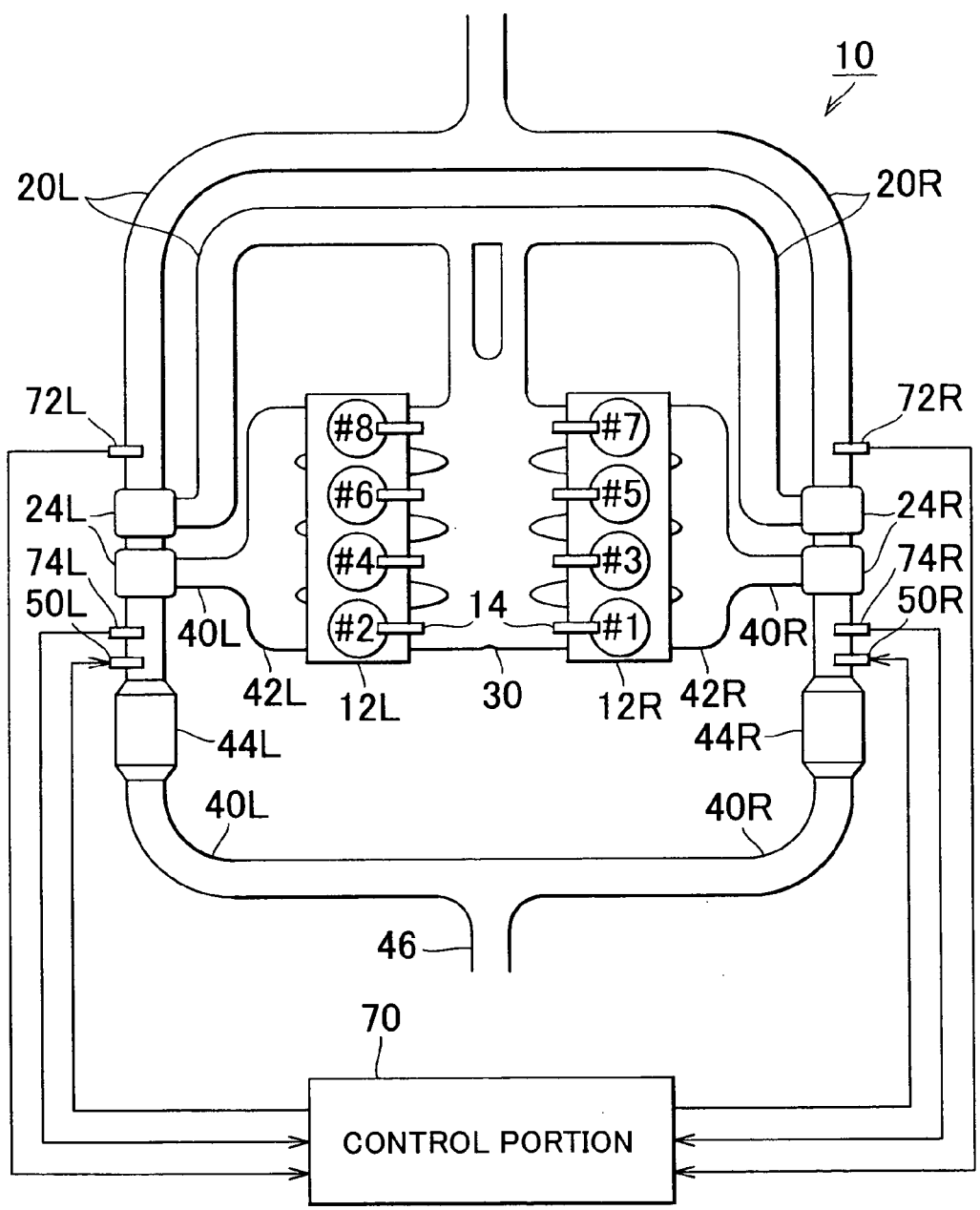
FIG. 1 is a block diagram schematically showing an internal combustion engine and a peripheral mechanism thereof.

In the following description and the accompanying drawings, the present invention will be described in more detail with reference to exemplary embodiments. Hereinafter, a first embodiment of the invention will be described with reference to FIG. 1 to FIG. 4. FIG. 1 schematically shows an internal combustion engine 10 and a peripheral mechanism thereof. As shown in FIG. 1, cylinders of the internal combustion engine 10 are arranged in a V-shape. Four cylinders are provided in a first bank (right bank) 12R, and four cylinders are provided in a second bank (left bank) 12L. Thus, eight cylinders #1 to #8 are provided in total. Fuel injection valves 14 which inject fuel are provided for the cylinders #1 to #8. The fuel injection valves 14 correspond to the respective cylinders #1 to #8.

A first intake pipe 20R and a second intake pipe 20L are connected to the cylinders #1, #3, #5, and #7 in the first bank 12R and the cylinders #2, #4, #6, and #8 in the second bank 12L through an intake manifold 30, respectively. Intake air taken through the intake pipes 20R and 20L is distributed to the cylinders #1 to #8 in the bank 12R and the bank 12L through the intake manifold 30. The intake pipes 20R and 20L and the intake manifold 30 constitute an intake passage.

A first exhaust pipe 40R and a second exhaust pipe 40L are connected to the cylinders #1, #3, #5, and #7 in the first bank 12R and the cylinders #2, #4, #6, and #8 in the second bank 12L through exhaust manifolds 42R and 42L. Exhaust gas discharged from the cylinders #1 to #8 is discharged to the exhaust pipes 40R and 40L through the exhaust manifolds 42R and 42L. The exhaust pipes 40R and 40L and the exhaust manifolds 42R and 42L constitute an exhaust passage.

Also, a supercharger 24R is provided in the bank 12R, and a supercharger 24L is provided in the bank 12L in the internal combustion engine 10. The superchargers 24R and 24L supercharge intake air using fluid force of exhaust gas. An air flow meter 72R is provided at a portion close to the supercharger 24R in the intake pipe 20R. An air flow meter 72L is provided at a portion close to the supercharger 24L in the intake pipe 20L. The air flow meters 72R and 72L detect a flow rate of intake air introduced to the cylinders #1 to #8.

Further, a purification mechanism 44R is provided downstream of the supercharger 24R in the exhaust pipe 40R. A purification mechanism 44L is provided at downstream of the supercharger 24L in the exhaust pipe 40L. Each of the purification mechanisms 44R and 44L includes a reduction catalyst (not shown) and a filter (not shown) therein. Nitrogen oxide (NOx) is removed by the reduction catalyst, and particulate matter (PM) in exhaust gas is captured by the filter.

A fuel supply valve 50R is provided at a portion which is downstream of the supercharger 24R and upstream of the purification mechanism 44R in the exhaust pipe 40R. A fuel supply valve 50L is provided downstream of the supercharger 24L and upstream of the purification mechanism 44L in the exhaust pipe 40L. The fuel supply valves 50R and 50L are connected to a common fuel pump (not shown). The fuel supply valves 50R and 50L inject fuel into the exhaust pipes 40R and 40L, respectively at a predetermined pressure. Thus, the fuel is supplied to the purification mechanisms 44R and 44L, and the function of each of the purification mechanisms 44R and 44L is recovered. Operation of each of the fuel supply valves 50R and 50L is controlled by a control portion 70 for the internal combustion engine 10.

Also, a temperature sensor 74R is provided at a portion which is downstream of the supercharger 24R and upstream of the fuel supply valve 50R. A temperature sensor 74L is provided at a portion which is downstream of the supercharger 24L and upstream of the fuel supply valve 50L. The temperature sensor 74R detects a temperature of exhaust gas flowing into the purification mechanism 44R, and the temperature sensor 74L detects a temperature of exhaust gas flowing into the purification mechanisms 44L. Detection signals from the temperature sensors 74R and 74L are input to the control portion 70. The control portion 70 determines that the exhaust gas flow rate becomes higher as the detected temperature becomes higher. A relationship between the exhaust gas flow rate and the detected temperature is obtained in advance, and is stored in memory (not shown) of the control portion 70. The control portion 70 sets fuel supply timing, that is, opening timing of each of the fuel supply valves 50R and 50L, based on the temperature of exhaust gas detected by each of the temperature sensors 74R and 74L, that is, the exhaust gas flow rate.

Figure 2:
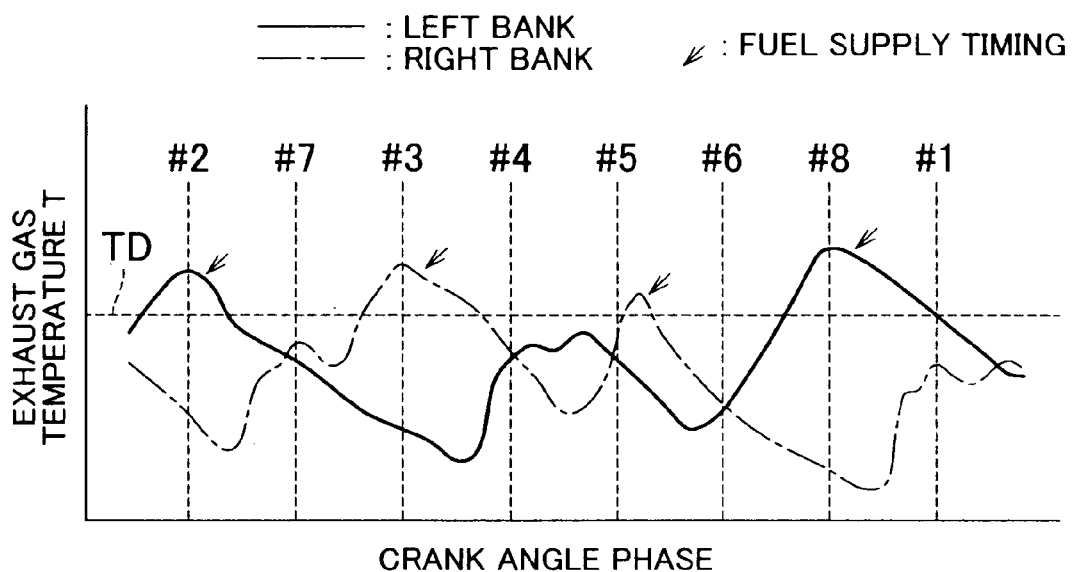
FIG. 2 is a graph showing a relationship between an exhaust gas temperature and a crank angle phase.

Hereinafter, control of fuel supply will be described. FIG. 2 shows a relationship between an exhaust gas temperature T and a crank angle phase. The cylinders of the internal combustion engine 10 according to this embodiment are arranged in a V-shape. As shown in FIG. 2, explosion occurs in the cylinders #1, #3, #5, and #7 in the right bank 12R at unequal intervals. That is, intervals between crank angle phases (shown by dash lines) at which explosion occurs in the cylinders #1, #3, #5, and #7 in the right bank 12R are unequal. Also, explosion occurs in the cylinders #2, #4, #6, and #8 in the left bank 12L at unequal intervals. That is, intervals between crank angle phases (shown by dash lines) at which explosion occurs in the cylinders #2, #4, #6, and #8 in the left bank 12L are unequal. Therefore, the exhaust gas flow rate in each of the exhaust pipes 40R and 40L becomes local maximum at unequal intervals. Also, in a case where explosion occurs in two cylinders in each of the banks 12R and 12L at a short interval, for example, in the case of explosion in the cylinder #7 and explosion in the cylinder #3, and in the case of explosion in the cylinder #6 and explosion in the cylinder #8, the exhaust gas flow caused by next explosion (i.e., explosion in the cylinder #3 and explosion in the cylinder #8) is joined to the exhaust gas flow caused by previous explosion (i.e., explosion in the cylinder #7, explosion in the cylinder #6).

Accordingly, in order to appropriately supply the fuel to the purification mechanisms 44R and 44L from the fuel supply valves 50R and 50L under this situation, it is desirable to set the fuel supply timing according to an actual exhaust gas flow rate. Therefore, in this embodiment, the actual flow rate is detected by each of the temperature sensors 74R and 74L. In addition, when the detected exhaust gas flow rate becomes equal to or higher than a predetermined value, the fuel is supplied.

Hereinafter, a series of processes for supplying the fuel will be described in detail with reference to a flowchart in FIG. 3. The control portion 70 repeatedly performs the series of processes in a predetermined control cycle. The series of processes described below is performed for each of the banks 12R and 12L.

First, the temperature sensor 74R detects the exhaust gas temperature T of the exhaust gas flowing into the purification mechanisms 44R, and the temperature sensor 74L detects the exhaust gas temperature T of the exhaust gas flowing into the purification mechanisms 44L (step S110). Next, it is determined whether a condition 1 described below is satisfied, more specifically, it is determined whether the exhaust gas temperature T is equal to or higher than a predetermined temperature TD (step S120).

$$\text{Condition 1 } T \geq TD \tag{1}$$

In this process, it is determined that the flow rate of the exhaust gas flowing into each of the purification mechanisms 44R and 44L is equal to or higher than the predetermined value, based on a fact that the exhaust gas temperature T is equal to or higher than the predetermined temperature TD.

When the exhaust gas temperature T is equal to or higher than the predetermined temperature TD, that is, when the exhaust gas flow rate is equal to or higher than the predetermined value (i.e., YES in step S120), the fuel supply valve 50R or 50L of the corresponding bank 12R or 12L is opened, and the fuel is supplied to the purification mechanism 44R or 44L (step S130). That is, when the exhaust gas temperature T for the first bank 12R (i.e., the right bank 12R), which is detected by the temperature sensor 74R, is equal to or higher than the predetermined temperature TD, the fuel is supplied to the purification mechanism 44R from the fuel supply valve 50R. Similarly, when the exhaust gas temperature T for the second bank 12L (i.e., the left bank 12L), which is detected by the temperature sensor 74L, is equal to or higher than the predetermined temperature TD, the fuel is supplied to the purification mechanism 44L from the fuel supply valve 50L. In FIG. 2, timing at which the fuel is supplied is indicated by an arrow. Then, this series of processes is terminated.

Meanwhile, when the exhaust gas temperature T is lower than the predetermined temperature TD, that is, when the exhaust gas flow rate is lower than the predetermined value (i.e., NO in step S120), the fuel is not supplied, and the series of processes is terminated.

According to the fuel supply control in this embodiment that has been described, the following effects can be obtained.

The exhaust gas temperature T that is a value correlated with the exhaust gas flow rate is actually detected using each of the temperature sensors 74R and 74L that are provided in the exhaust pipes 40R and 40L, respectively. Then, the timing at which the fuel is supplied to each of the purification mechanisms 44R and 44L is controlled based on a result of detection. Accordingly, even when the exhaust gas flow rate in each of the exhaust pipes 40R and 40L is variously changed according to an engine operating state, it is possible to set the fuel supply timing based on the flow rate that is appropriately detected. Thus, the fuel supplied from the fuel supply valve can be appropriately conveyed to the purification mechanisms 44R and 44L using force of the flowing exhaust gas. As a result, it is possible to appropriately recover the function of each of the purification mechanisms 44R and 44L while suppressing adhesion of the supplied fuel to a wall surface of the exhaust passage.

Further, the fuel supply timing is set such that the fuel is supplied during the period in which the exhaust gas temperature T is equal to or higher than the predetermined temperature TD, that is, the period in which the exhaust gas flow rate is equal to or higher than the predetermined value. Accordingly, since the fuel is supplied during the period in which the exhaust gas flow rate is sufficiently high, the function of each of the purification mechanisms 44R and 44L can be appropriately recovered. Thus, it is possible to prevent the supplied fuel from adhering to the inner wall of each of the exhaust pipes 40R and 40L.

In the exhaust pipe 40R, since the flows of the exhaust gas that are intermittently discharged from the cylinders #1, #3, #5, and #7 in the first bank 12R are joined together, the flowing condition of the exhaust gas tends to be complicated. Also, in the exhaust pipe 40L, since the flows of the exhaust gas that are intermittently discharged from the cylinders #2, #4, #6, and #8 in the second bank 12L are joined together, the flowing condition of the exhaust gas tends to be complicated. However, in this embodiment, it is possible to appropriately set the fuel supply timing for the exhaust pipes 40R and 40L based on the detected flowing condition of the exhaust gas.

Also, in this embodiment, the fuel needs to be supplied to the exhaust pipes 40R and 40L for the right and left banks 12R and 12L. However, it is possible to minimize the possibility that the fuel supply timing for the exhaust pipes 40R overlaps the fuel supply timing for the exhaust pipes 40L, by appropriately setting the fuel supply timing for each of the exhaust pipes 40R and 40L. Accordingly, it is possible to suppress an increase in size of the common pump for supplying the fuel to the fuel supply valves 50R and 50L. Also, it is possible to suppress a decrease in injection pressure at which the fuel is supplied.

Also, the fuel can be supplied by injecting the fuel from the fuel injection valve 14 provided in each of the cylinders #1 to #8 of the internal combustion engine 10 during an exhaust stroke. However, in this embodiment, the fuel is supplied from the fuel supply valves 50R and 50L provided in the exhaust pipes 40R and 40L, respectively. Accordingly, the fuel can be supplied to the purification mechanisms 44R and 44L with no restriction being imposed by the fuel injection into each of the cylinders #1 to #8. That is, the fuel can be supplied to the purification mechanisms 44R and 44L, separately from the fuel injection into each of the cylinders #1 to #8.

Next, a second embodiment of the invention will be described with reference to FIG. 4. The second embodiment is different from the first embodiment in that the fuel supply timing is set such that the fuel is supplied when a variation tendency of the exhaust gas flow rate changes from an increasing tendency to a decreasing tendency during the period in which the exhaust gas flow rate is equal to or higher than the predetermined value. Hereinafter, this difference will be described.

Figure 3:
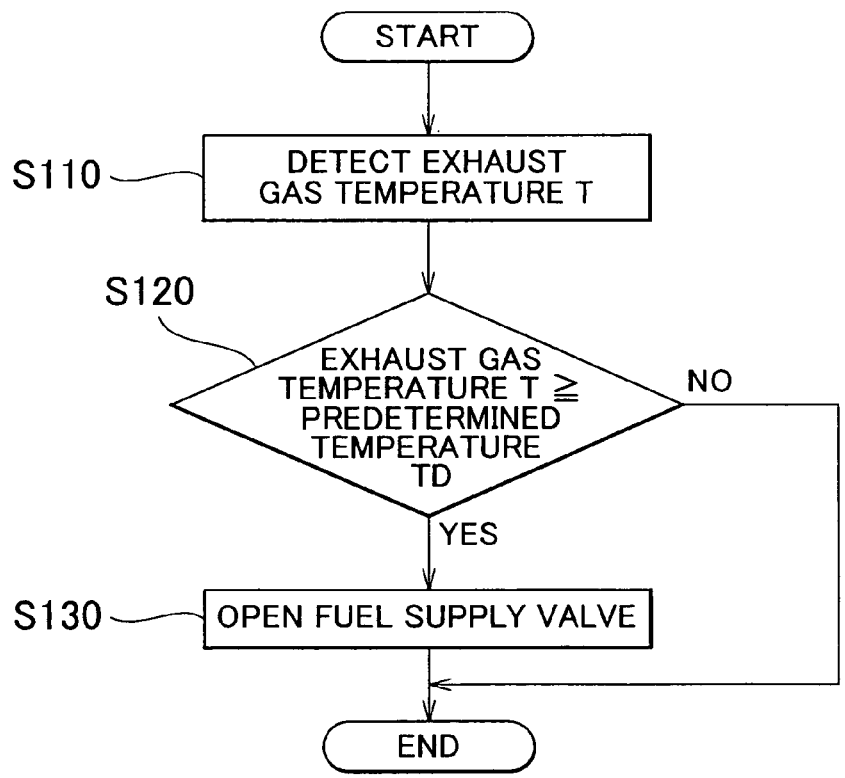
FIG. 3 is a flowchart showing processes according to a first embodiment of the invention.

In this embodiment, step S125 shown in FIG. 4 is inserted between step S120 and step 130 in the series of processes shown in the flowchart in FIG. 3.

That is, when the exhaust gas temperature T is equal to or higher than the predetermined temperature TD, (i.e., YES in step S120), next, it is determined whether both of a condition 2 and a condition 3 described below are satisfied (step S125). In each of the conditional equations (2) and (3), "T (n)" signifies an exhaust gas temperature that is presently detected (in a control cycle "n"); "T (n–i)" signifies an exhaust gas temperature that is detected before (i) control cycles; and "T (n–j)" signifies an exhaust gas temperature that is detected before (j) control cycles.

Condition 2 $T(n-i)-T(n-j)>0$        (2)

Condition 3 $T(n)-T(n-i)<0$        (3)

$j>i\geqq 1$ Both of "j" and "i" are integer numbers (for example, j=2, i=1). When both of the conditions 2 and 3 are satisfied (i.e., YES in step S125), the variation tendency of the exhaust gas temperature T changes from the increasing tendency to the decreasing tendency. In other words, when both of the conditions 2 and 3 are satisfied, it is determined that the variation tendency of the exhaust gas flow rate changes from the increasing tendency to the decreasing tendency, that is, the exhaust gas flow rate becomes local maximum. In this case, in a process in step S130, the fuel supply valve 50R or 50L for the corresponding bank 12R or 12L is opened, and the fuel is supplied from the fuel supply valve 50R or 50L to the purification mechanism 44R or 44L.

Meanwhile, when one of the conditions 2 and 3 is not satisfied (i.e., NO in step S125), the fuel is not supplied, and the present series of processes is terminated. That is, in this embodiment, even during the period in which the exhaust gas temperature T is equal to or higher than the predetermined temperature TD, if the exhaust gas temperature is not local maximum, the fuel is not supplied.

According to the second embodiment that has been described, the following effects can be obtained in addition to the effects obtained in the first embodiment.

The change in the variation tendency of the exhaust gas flow rate from the increasing tendency to the decreasing tendency is detected based on the change in the exhaust temperature T. When the variation tendency of the exhaust gas flow rate changes from the increasing tendency to the decreasing tendency, that is, when the exhaust gas flow rate becomes local maximum, the fuel is supplied. Therefore, it is possible to more appropriately recover the function of each of the purification mechanisms.

Although the embodiments of the invention have been described, these embodiments can be modified as follows.

In the second embodiment, the fuel is supplied when the exhaust gas flow rate becomes local maximum. However, for example, in a case where each of the temperature sensors 74R and 74L is disposed at a distance from a position at which the fuel is supplied, the fuel supply timing may be set considering the flow of the exhaust gas. More specifically, a time interval may be provided between the timing at which the exhaust gas flow rate becomes local maximum, and the fuel supply timing.

More specifically, for example, in a case where the fuel supply valves 50R and 50L are provided at positions downstream of the temperature sensors 74R and 74L at a predetermined distance L from the temperature sensors 74R and 74L, respectively, and influence of the predetermined distance L is not negligible, it is preferable that the fuel supply timing should be set such that the fuel is supplied after the exhaust gas flow rate becomes local maximum. Also, in this case, it is preferable that a delay period L/V should be calculated based on an exhaust gas flow rate V that is obtained based on the predetermined distance L and the engine operating state, and the fuel supply timing should be set based on the delay period L/V according to an equation, (the timing at which the local maximum value is detected by each of the temperature sensors 74R and 74L)+(L/V).

Meanwhile, in a case where the fuel supply valves 50R and 50L are provided upstream of the temperature sensors 74R and 74L at a predetermined distance L from the temperature sensors 74R and 74L, respectively, and influence of the predetermined distance L is not negligible, it is preferable that the fuel supply timing should be set such that the fuel is supplied before the exhaust gas flow rate becomes local maximum. Also, in this case, it is preferable that the timing at which the exhaust gas flow rate becomes local maximum should be learned, the delay period L/V should be calculated based on the exhaust gas flow rate V that is obtained based on the predetermined distance L and the engine operating state, and the fuel supply timing should be set based on the delay period L/V according to an equation, (the timing at which the local maximum value is detected by each of the temperature sensors 74R and 74L)−(L/V). The exhaust gas flow rate V may be estimated based on an engine rotational speed or an intake air amount, or based on both of the engine rotational speed and the intake air amount, in both of the case where the fuel supply valves 50R and 50L are provided upstream of the temperature sensors 74R and 74L, and the case where the fuel supply valves 50R and 50L are provided downstream of the temperature sensors 74R and 74L.

In the aforementioned embodiments, the fuel supply timing is set based on the period in which the exhaust gas flow rate is equal to or higher than the predetermined value, and the timing at which the exhaust gas flow rate becomes local maximum. However, for example, the fuel supply timing may be set based on only the timing at which the exhaust gas flow rate becomes local maximum.

In each of the aforementioned embodiments, the amount of the fuel to be supplied is set to be constant. However, for example, the amount of the fuel to be supplied may be variably set based on the engine operating state and the exhaust gas flow rate. More specifically, it is preferable that the amount of the fuel to be supplied should be increased as the exhaust gas flow rate becomes higher, and the amount of the fuel to be supplied should be decreased as the exhaust gas flow rate becomes lower.

In each of the aforementioned embodiments, the purification mechanism includes the reduction catalyst and the filter therein. However, the purification mechanism may include only a filter or a catalyst.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An exhaust gas control apparatus for an internal combustion engine, in which fuel is supplied to a purification mechanism provided in an exhaust passage so that a function of the purification mechanism is recovered, comprising:
   a sensor which is provided in the exhaust passage, and which performs detection of a flow rate of exhaust gas flowing in the exhaust passage or a value correlated with the flow rate; and
   a controller which controls fuel supply timing at which the fuel is supplied, based on a result of the detection performed by the sensor;
   wherein the controller sets the fuel supply timing such that the fuel is supplied not at constant load but at local maximum, when a variation tendency of the flow rate of the exhaust gas changes from an increasing tendency to a decreasing tendency, based on a result of the detection performed by the sensor.

2. An exhaust gas control apparatus for an internal combustion engine, in which fuel is supplied to a purification mechanism provided in an exhaust passage so that a function of the purification mechanism is recovered, comprising:
   a sensor which is provided in the exhaust passage, and which performs detection of a flow rate of exhaust gas flowing in the exhaust passage or a value correlated with the flow rate;
   a controller which controls fuel supply timing at which the fuel is supplied, based on a result of the detection performed by the sensor; and
   wherein the controller sets the fuel supply timing not at constant load, such that a time interval is provided between timing at which a variation tendency of the detected flow rate of the exhaust gas changes from an increasing tendency to a decreasing tendency and the fuel supply timing at which the fuel is supplied, and
   wherein the fuel is supplied from a fuel supply valve that is provided upstream of the purification mechanism in the exhaust passage of the internal combustion engine.

3. The exhaust gas control apparatus for an internal combustion engine, according to claim 2, wherein the fuel supply valve is provided downstream of the sensor in the exhaust passage; and the controller sets the fuel supply timing such that the fuel is supplied from the fuel supply valve after the variation tendency of the detected flow rate of the exhaust gas changes from the increasing tendency to the decreasing tendency.

4. The exhaust gas control apparatus for an internal combustion engine, according to claim 2, wherein the fuel supply valve is provided upstream of the sensor in the exhaust passage; and the controller performs learning of the variation tendency of the detected flow rate of the exhaust gas, and the controller sets the fuel supply timing such that the fuel is supplied from the fuel supply valve before the variation tendency of the flow rate of the exhaust gas changes from the increasing tendency to the decreasing tendency, based on a result of the learning.

5. The exhaust gas control apparatus for an internal combustion engine, according to claim 2, wherein the controller calculates an estimated flow rate of the exhaust gas based on an engine rotational speed and an amount of intake air, and decides the time interval based on the estimated flow rate of the exhaust gas and a distance between the sensor and the fuel supply valve.

6. An exhaust gas control method for an internal combustion engine, in which fuel is supplied to a purification mechanism provided in an exhaust passage so that a function of the purification mechanism is recovered, comprising:
   performing detection of a flow rate of exhaust gas flowing in the exhaust passage or a value correlated with the flow rate;
   controlling fuel supply timing at which the fuel is supplied, based on a result of the detection; and
   setting the fuel supply timing such that the fuel is supplied not at constant load but at local maximum, when a variation tendency of the flow rate of the exhaust gas changes from an increasing tendency to a decreasing tendency, based on a result of the detection.

7. An exhaust gas control method for an internal combustion engine, in which fuel is supplied to a purification mechanism provided in an exhaust passage so that a function of the purification mechanism is recovered, comprising:
   performing detection of a flow rate of exhaust gas flowing in the exhaust passage or a value correlated with the flow rate;
   controlling fuel supply timing at which the fuel is supplied, based on a result of the detection; and
   setting the fuel supply timing not at constant load, such that a time interval is provided between timing at which a variation tendency of the detected flow rate of the exhaust gas changes from an increasing tendency to a decreasing tendency and the fuel supply timing at which the fuel is supplied, and
   wherein the fuel is supplied from a fuel supply valve that is provided upstream of the purification mechanism in the exhaust passage of the internal combustion engine.

8. The exhaust gas control method for an internal combustion engine according to claim 7, wherein the fuel supply valve is provided downstream of the sensor in the exhaust passage, further comprising:
   setting the fuel supply timing such that the fuel is supplied from the fuel supply valve after the variation tendency of the detected flow rate of the exhaust gas changes from the increasing tendency to the decreasing tendency.

9. The exhaust gas control method for an internal combustion engine according to claim 7, wherein the fuel supply valve is provided upstream of the sensor in the exhaust passage, further comprising:
   performing learning of a variation tendency of the detected flow rate of the exhaust gas; and
   setting the fuel supply timing such that the fuel is supplied from the fuel supply valve before the variation tendency of the flow rate of the exhaust gas changes from the increasing tendency to the decreasing tendency, based on a result of the learning.

10. The exhaust gas control method for an internal combustion engine according to claim 7, further comprising:
   calculating an estimated flow rate of the exhaust gas based on an engine rotational speed and an amount of intake air; and
   deciding the time interval based on the estimated flow rate of the exhaust gas and a distance between the sensor and the fuel supply valve.

* * * * *